May 26, 1936.　　　E. T. FLEWELLING　　　2,042,251
AUDION TESTER
Filed Oct. 25, 1929　　2 Sheets—Sheet 1

Inventor
Edmund T. Flewelling
By J. C. Walker, Attorney

May 26, 1936.　　　E. T. FLEWELLING　　　2,042,251
AUDION TESTER
Filed Oct. 25, 1929　　　2 Sheets-Sheet 2
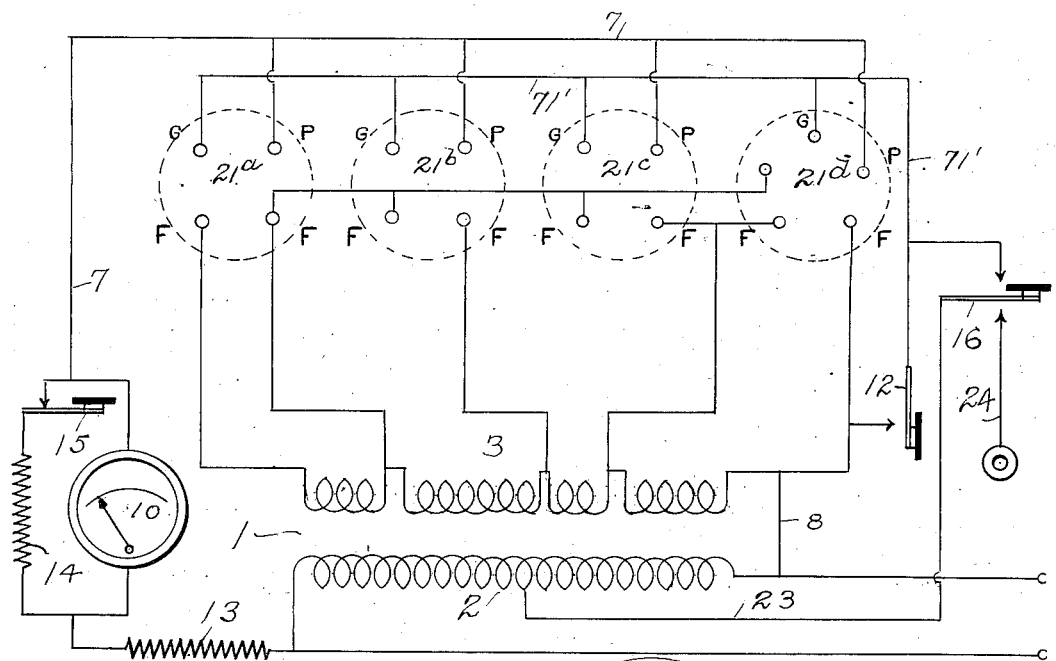
Fig. 4
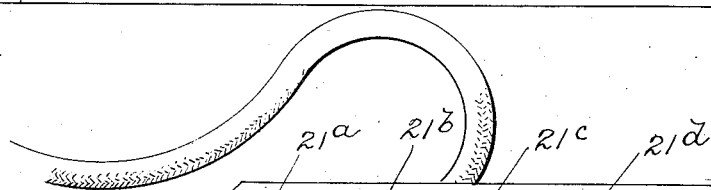
Fig. 5
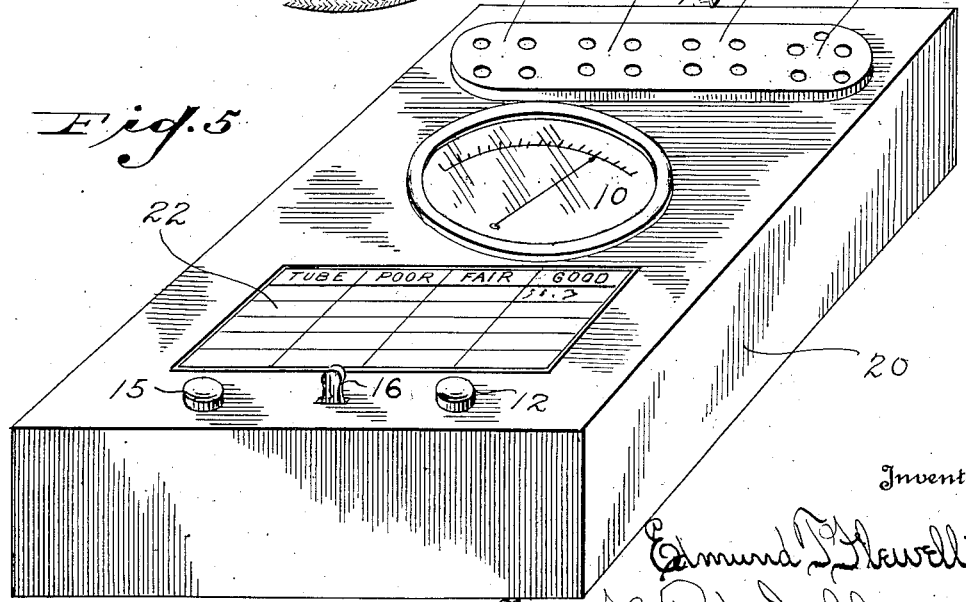
Inventor
Edmund T. Flewelling
By F. L. Walker
Attorney Patented May 26, 1936

2,042,251

UNITED STATES PATENT OFFICE 2,042,251

AUDION TESTER

Edmund T. Flewelling, Dayton, Ohio, assignor to Frank L. Walker, Dayton, Ohio

Application October 25, 1929, Serial No. 402,496

8 Claims. (Cl. 250—27)

This invention relates to a method and apparatus for testing the efficiency of vacuum tubes or thermionic valves by determining for comparison with a known standard the capacity of the tube to pass rectified current therethrough upon the application of known alternating voltages to the plate or anode and to the filament.

If a vacuum tube is placed in an alternating current circuit with correct voltage applied to its filament and a known alternating voltage applied to its anode or plate, current will flow in the plate circuit in proportion to the applied plate voltage and the electronic emitting ability of the filament. That is, at a given plate voltage the volume of current flow in relation with a known standard is directly indicative of the efficiency of the tube.

The vacuum tube under test operates as a rectifier, passing current only on the positive impulse of the alternating current flow which may be measured by a suitable direct current meter. The meter employed may be a highly damped commercial milliammeter of the direct current type having a range sufficient to cover the current fluctuations, usually reading from 0 to 20 milliamperes. As the current polarity swings negative, no appreciable current will flow and the meter is unaffected. Upon the positive impulse the meter will respond to indicate the current flow. The reading will be fairly steady due to the inability of the meter to follow the rapid change of polarity of the alternating plate voltage. While the meter scale is graduated in milliamperes, in the present case the indications are considered only as arbitrary units of measure for comparison with known standards or one with another. By introducing grid bias or grid potential influence into the circuit, the current flow will be changed, the degree of change being indicative of the effectiveness of the grid element of the tube under test. Such arbitrary measurements of plate current flow in comparison with known standards, and arbitrary measurement of the effect of the grid on the circuit in comparison with the current flow in the absence of grid influence correctly and reliably indicates the effectiveness and efficiency of the tube and its comparative value for radio or amplifying operation.

Vacuum tubes have heretofore been tested by applying either direct or alternating current to the plate and filament and taking different readings with respectively positive and negative grid bias potentials. Also tubes have been tested by interconnecting the plate and grid elements, and applying alternating voltage thereto, under which condition the current flow is indicative of the total electronic emission capacity of the filament. Such tests lack the accuracy of the present method and necessitate more complicated circuits and expensive apparatus than that herein described.

If, in any of the test devices heretofore devised, a defective tube is introduced into the circuit wherein the plate is in short circuit to the filament or to the grid so that alternating current will flow in the anode or plate circuit, the full line voltage will be delivered to the meter, causing its serious injury with possible destruction. To safeguard against such accidental injury of the meter and automatically limit the alternating current flow under such abnormal condition to a degree that will not be detrimental to the measuring instrument, a resistance unit is introduced by the present construction into the plate circuit in series with the meter. The meter readings when testing a normal tube are but slightly affected by such resistance. However, as the readings are but arbitrary units for comparative purposes, such change of indication is quite immaterial.

As a further protection in the event a tube under test may have the ability to pass rectified current beyond the capacity of the meter, there is provided in the present apparatus a resistance shunt about the instrument through which a part of the current flow may be bypassed, and having therein a switch by which such shunt may be opened to pass the full current flow through the meter in the event the tube being tested does not pass sufficient current to induce ample deflection of the meter indicator.

Since at the present time there are numerous types of tubes on the market possessing various filament and grid voltage requirements, the present apparatus is designed for universal use in testing tubes of different types. This is done by providing different tube socket connections for the different tubes having different connection with transformer windings to supply various filament and grid voltages to different tube socket connections, the same plate voltage being applied to all socket connections.

Instead of measuring the plate current flow with alternate positive and negative grid bias applied to the grid element, or with the grid connected alternately first to one side and then to the other of the filament circuit, a switch is provided for connecting and disconnecting the grid element which may be connected with one side only of the energizing circuit and when connected always possesses the same potential characteristic. The present apparatus also includes connections for testing screen grid tubes by taking readings of the current flow with the plate and screen grid and the plate and control grid alternately connected. Readings may be taken as in the ordinary three-element tube while a comparative indication of the effect of the screen grid or fourth element is had by connecting the screen grid to the plate element through a resistance of sufficient value to create a different potential between the plate and the screen grid, or by connecting the screen grid with the transformer winding at a point to supply the required grid voltage. The closing of this connection gives a reading different from that of the plate current alone and different from that of the plate current when influenced by the control grid bias, and indicates the comparative effect of the screen grid or fourth element upon the plate current flow.

The object of the invention is to simplify the apparatus as well as the means and method of testing audion tubes, whereby the apparatus will not only be cheapened in construction, but will be more efficient in operation, of greater accuracy and increased sensitiveness, easily operated, of greater durability and unlikely to get out of repair.

A further object is to provide a simplified method of comparative test for audion tubes necessitating minimum number of connections and operating parts.

A further object of the invention is to provide a test apparatus employing alternating current for energizing the audion circuits, and having therein safety means for preventing the injury of the indicating and measuring instrument in the event a defective or short circuited tube is introduced into the test system.

A further object of the invention is to provide means for compensating for abnormally large and abnormally small volume of plate current flow whereby both may be measured within an ample deflection range of the meter.

A further object of the invention is to provide an audion test method and apparatus applicable to screen grid tubes.

A further object of the invention is to provide an audion test method and apparatus of universal application to various types of tubes having different filament and grid voltage requirements.

With the above primary and other incidental objects in view, as will more fully appear in the specification, the invention consists of the features of construction, the parts and combinations thereof, and the mode of operation or their equivalent as hereinafter described and set forth in the claims.

Referring to the accompanying drawings wherein is shown the preferred but obviously not necessarily the only form of embodiment of the invention, Fig. 1 is a diagrammatic view of the fundamental circuit of the audion testing apparatus, forming the subject matter hereof and employed in carrying out the method of audion testing.

Fig. 4 is a circuit diagram of a universal audion testing apparatus embodying the fundamental circuits shown in Figs. 1, 2, and 3 with adaptations for testing tubes of various types.

Fig. 5 is a perspective view of a commercial form of tube testing apparatus forming the subject matter hereof.

Like parts are indicated by similar characters of reference throughout the several views.

Figure 1:
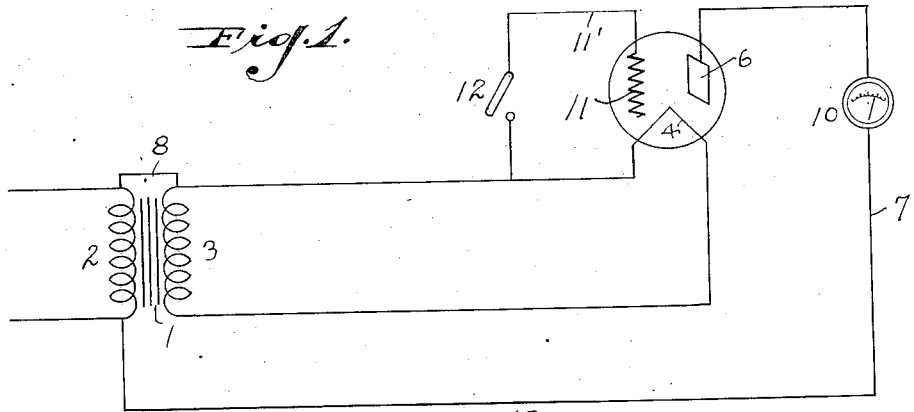

Referring to the accompanying drawings, 1 indicates a transformer, the primary 2 of which is to be connected across a suitable source of alternating current which preferably, though not necessarily, may be an ordinary 110 volt 60 cycle lighting circuit. The ratio winding of the "step-down" transformer 1 is such that the secondary winding 3 will deliver to the filament 4 of an audion to be tested the requisite filament voltage. If desired, a rheostat 5 may be introduced into the filament circuit by which any necessary accurate adjustment of the filament voltage may be secured.

The plate element 6 of the audion is directly connected with one side of the source of alternating current supply, by a conductor line 7 wholly independent of the transformer 1. Thus the full 110 volt 60 cycle alternating current is impressed upon the anode or plate element 6. Since this is the type of lighting current supply most generally available for convenience and simplicity, 110 volt alternating current has been adopted as the established or standard plate current for testing all types of tubes. Such plate voltage is well within the maximum voltage range of various tubes which varies from a maximum of 135 volts for the well known 201—A type of audion tube to 450 volts plate current for the more recently developed 250 type of audion tube. The opposite side of the alternating current supply is connected into the filament supply circuit. For convenience, as illustrated in the circuit diagram, this may be effected by a jumper connection 8 across the primary and secondary terminals of the transformer 1. Thus while the filament voltage supplied by the secondary winding of the transformer 1 is restricted to the normal voltage requirement of the audion, ordinarily ranging from 2½ to 6 volts, the full voltage potential is impressed upon the plate or anode element 6, and likewise impressed upon the cathode element 4 to effect the usual space discharge between these elements.

The audion acts as a rectifier, permitting current to flow in one direction only. That is to say, the audion passes only half of the alternating current wave, thus inducing in the plate circuit a pulsating direct current. Included in the conductor line 7 of the plate circuit is a direct current milliammeter 10 having a range sufficient to cover the usual variations of plate current volume of different tubes. For the ordinary testing of commercial tubes, a milliammeter reading from naught to 20 milliamperes will be found sufficient.

The grid element 11 of the audion tube is normally disconnected from the source of energizing current and is adapted to be intermittently connected with the system to receive a biasing potential. Such connection and disconnection of the grid is effected by a manually operated switch 12 by the closing of which the grid element is connected with one side of the filament circuit. By alternating opening and closing the switch 12, two readings may be taken up the meter 8, one indicating the flow of current in the plate circuit un-influenced by the grid, and the other indicating the flow of current in such plate circuit when subjected to the grid bias. The difference between these readings accurately indicates the effect or influence of the grid element in the circuit and a comparison of these readings with known standards obtained from the test of an audion of maximum efficiency is indicative of the comparative worth of the tube under test for radio purposes. The grid element may be connected to either side of the filament, the phase relations being unimportant. It is connected, however, to one side of the filament only and preferably to that side in opposite phase relation to the plate.

As before mentioned, the audion under test operates as a rectifier, and the current being passed by the audion and measured by the meter 10 in the plate circuit is direct current, the meter being a direct current milliammeter. Such meter is liable to serious injury when subjected to alternating current influence. In the event that the tube under test proves to be defective due to short circuit contact of either the grid or the filament with the plate element, or if for any other reason the audion fails to rectify the current, 110 volt alternating current will be passed into the plate circuit and hence through the measuring instrument 10. To minimize the flow of alternating current under such circumstances and to protect the instrument 10 against injury thereby, safety means is introduced into the plate circuit, which in this instance consists of a resistance element 13 connected in series with the meter 10. It is obvious that other electrically operated safety devices may be employed such as an automatic circuit breaker, fuse or the like. The resistance unit 13 is of such value as to limit the alternating current flow under such abnormal condition to a maximum which will not have injurious effect upon the meter. In practice, a resistance of approximately 800 ohms has been found amply sufficient for this purpose. Such resistance will only slightly change the current volume indications when testing a good audion, and since the indications are considered only as arbitrary units of measurement for comparative purposes, they are quite as useful in determining the operative qualities of the audion as if the meter responded to the true electrical capacity. The introduction of such resistance unit 13 as a safety device protects the apparatus against injury and obviates the necessity for a replacement of the instrument 10 each time a defective tube is encountered.

Commercial audion tubes vary quite widely in their ability to rectify or pass current. Some tubes will pass a quite large volume of current, exceeding the deflection range of the meter 10, while other tubes will pass but a very small volume of current, insufficient to give to the meter ample deflection for a satisfactory reading. To compensate for this wide variation of tubes to be tested, there is provided in the present construction a shunt circuit about the meter 10, in which are included a resistance unit 14 and a normally closed switch 15. Normally a portion of the plate current will be bypassed through this resistance shunt around the meter 10, permitting a portion of the current to pass through the meter not greater than sufficient to cause a full deflection of the indicator. Thus when an audion is encountered which passes an excessive volume of current beyond the capacity of the meter 10, the bypass resistance shunt is effective in relieving the meter of the excess volume of current and bringing the volume of current passing thru the meter within its reading range. If, however, an audion is encountered which possesses a minimum rectifying or current passing characteristic so that the current flowing in the plate circuit normally with the bypass resistance shunt closed is insufficient to afford ample deflection of the meter indicator, the shunt switch 15 is manually opened by means of a push-button allowing the full volume of plate current to flow through the meter 10 thus affording an increased deflection and a more satisfactory reading. By accurately calibrating the resistance unit 14 so that its relation to the instrument 10 may be definitely known and its effect considered in conjunction with the indicated reading of the meter 10, the plate current flow is very accurately determined. Such meter readings are taken to determine the plate current flow both with and without the effect of grid bias.

For the testing of four-element or screen grid tubes, a further addition is made to the fundamental circuit whereby the fourth element or screen grid may be intermittently connected with and disconnected from the plate circuit to impress thereon ample grid voltage. This screen grid voltage is supplied through a resistance unit by which the effective voltage is reduced to the required degree. While the switch 12 may be employed in the manner heretofore described for connecting the control grid of such four-element audion with the filament circuit to impress thereon a biasing grid voltage, it is found that the use of the switch 12 is not entirely satisfactory in the testing of screen grid tubes because the voltage thus supplied to the grid is not enough to give satisfactory indication. Hence provision is made for connecting the control grid also with the plate circuit to receive a biasing voltage. This is effected by a two-way switch whereby grid biasing voltage may be alternately impressed upon the control grid and the screen grid of such four-element audion. This circuit is diagrammatically illustrated in Fig. 3. As therein illustrated, a double-throw switch 16 having direct connection with the plate circuit when moved in one direction interconnects the grid element 17 through a resistance unit 18 with such plate circuit thereby impressing upon the screen grid 17 the required biasing voltage. When the double throw switch 16 is moved in the opposite direction it connects the control grid 11 through the line 19 to such switch and thence to the plate circuit to impress thereon the required biasing voltage. Thus as the switch 16 is thrown first in one direction and then in the other, it serves to impress biasing grid voltages alternately upon the control grid and upon the screen grid. In its normal intermediate position, the switch 16 is disconnected from both grid elements and hence the meter 10 will give a reading of current volume flowing in the plate circuit uninfluenced by either grid elements. Furthermore, by closing the switch 12 the control grid 11 will receive a grid biasing voltage as in an ordinary three-element audion and a fourth reading can thus be taken if desired. In lieu of employing the resistance 18 in the screen grid lead, and instead of supplying biasing voltage to the control grid and screen grid from the plate circuit, the primary winding 2 of the transformer 1 may be tapped at a suitable point to afford the necessary grid biasing voltage and a lead taken therefrom direct to the switch 16, as indicated by dotted lines in Fig. 3 and as shown in Fig. 4. This connection of the switch 16 with the tapped primary of the transformer is in lieu of its connection with the plate circuit, and the resistance 18 is omitted.

Figure 2:
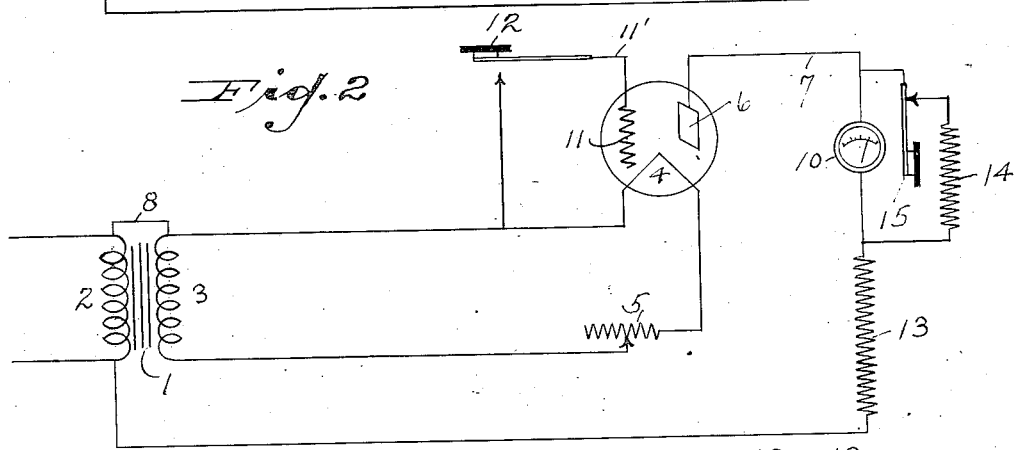
Fig. 2 is a similar diagrammatic view of the audion testing circuit in which has been embodied safety means and compensating means for extreme range of plate current volume.
Figure 3:
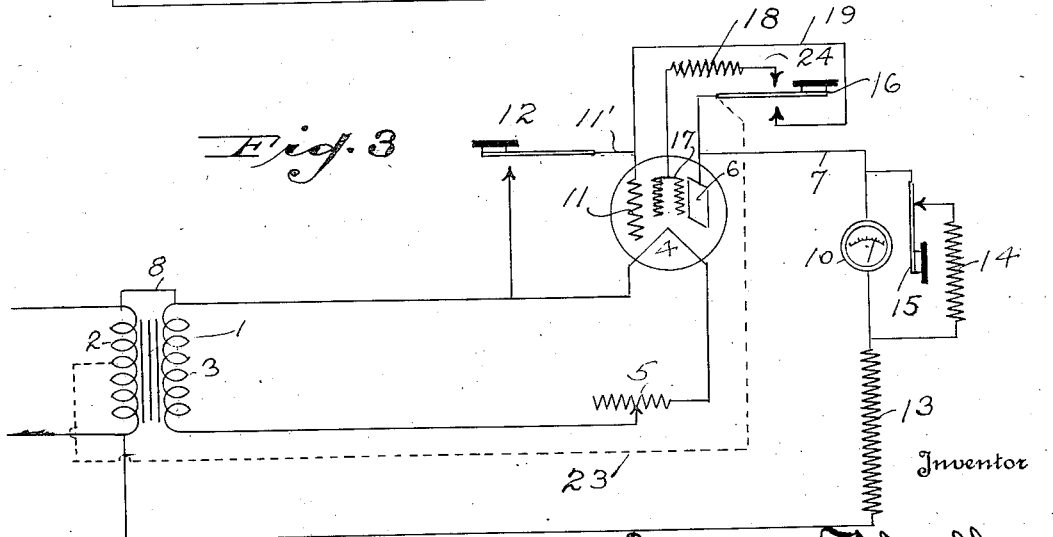
Fig. 3 is a diagrammatic view of the fundamental audion testing circuit in which is incorporated screen grid tube testing connections.

Inasmuch as there are now upon the market a wide variety of audion tubes possessing different characteristics and having different filament, grid, and plate voltage requirements, in order to provide a universal test apparatus applicable to testing any one of a number of different commercial tubes, the fundamental circuit illustrated in Fig. 1 with the protective, compensating, and screen grid addition illustrated in Figs. 2 and 3 have been incorporated into a single apparatus having accommodation for tubes of different character. The wiring circuit for such commercial testing apparatus is illustrated in Fig. 4. The apparatus enclosing housing with the measuring instrument therein and audion receiving sockets mounted thereon is shown in Fig. 5. This apparatus comprises a box-like enclosure 20 within which is contained the transformer 1 and various wiring connections and switches. On top of the case or container is located a series of tube sockets 21a, 21b, 21c, and 21d. The measuring instrument 10 is located in the top of the case 20. The various switch buttons 12, 15, and 16 are conveniently disposed in the top of the case 20 for manual manipulation. Also provided upon the top of the case or housing 20 is a chart 22 carrying in appropriate spaces the standard characteristic indices of the various audion tubes to be tested, with which the characteristics indicated by the measuring instrument 10 may be compared.

As is illustrated in the fundamental circuit, the primary winding 2 of the transformer 1 is connected across the input terminal leading from the source of 110 volts 60 cycle alternating current supply. Connected with one side of the input circuit and hence with one side of the primary winding 2 is the plate circuit conductor 7 which is common to the plate connections of each of the tube sockets 21a, 21b, 21c, and 21d to which this plate circuit conductor 7 is connected by branch leads 7. Included in this plate circuit line 7 is the measuring instrument 10. Bridged across the terminals of the meter 10 is the resistance shunt containing the compensating resistance element 14 and switch 15. Also included in the plate circuit line 7 leading to the multiple plate connections of the several sockets and in series with the instrument 10, is the protective resistance element 13.

The secondary winding 3 of the transformer 1 is tapped at spaced intervals to afford the necessary filament voltages for tubes tested in the different sockets 21a, 21b, 21c, and 21d, and also to provide for a common return connection from the opposite filament terminals of the several sockets. The respective sections of the secondary winding may be proportioned to afford any desired different voltages upon the filament connections of the different tube sockets. Merely for illustrative purposes and with no intent to limit the construction to any specific voltage output, the wiring diagram, Fig. 4, of the commercial test apparatus shows the voltage apportionment as commonly employed at the present time in commercial devices. In such arrangement the secondary winding 3a of the transformer 1 supplies one and one half volts to the filament connections of the tube socket 21a, while the secondary winding 3b of the transformer 1 supplies a filament voltage of three volts to the tube socket 21b. The secondary winding 3c is proportioned to afford a filament voltage of 5 volts to the tube socket 21c and the secondary winding 3d of the transformer supplies the tube socket 21d with a filament voltage of 2½ volts. Those audion tubes which require an operating filament voltage of 7½ volts are tested with five volts on their filaments by inserting them in the receiving socket 21c. The secondary winding 2b of the transformer 1, which normally supplies a filament voltage of 3 volts to the audion tube socket 21b with a current drain of only a fraction of an ampere, is so designed that upon insertion of an audion tube having a filament voltage requirement of 2½ volts and drawing 1½ amperes, that is to say, the standard 245 type of tube, such increased load will cause a voltage drop to 2½ volts due to the increased load or current drain to 1½ amperes in lieu of the normal drain of only a fraction of an ampere at 3 volts.

The sockets are arranged in progressive sequence in such relation that the biasing voltage best suited to the audions tested in different sockets applied to the grid connections of succeeding audion sockets is cumulative. The grid connections of the several sockets are connected in multiple through the grid return line 11' in which is included the switch 12, to the transformer secondary terminal and incidentally through the jumper connection 8 to one side of the input line. The different voltage windings of the transformer secondary are interconnected in series with the filament leads extending therefrom at spaced intervals. One or more sections of the transformer secondary are included in the grid returns from different sockets. This inclusion of progressively increasing proportions of the secondary winding in the return from succeeding grid connections results in a progressive voltage drop in the biasing voltages pertaining to different socket connections. For example, the grid biasing voltage impressed upon the grid of an audion of the 226-type tested in the socket 21a to which 1½ volts filament current is supplied is 1½ volts above the filament voltage. Upon the grid of a 171-type audion tested at 5 volts filament voltage, a grid bias of 7½ volts is impressed, while upon the grid of a 227-type audion tested with 2½ volts upon the filament, there is impressed a biasing voltage of 9 volts. It is to be understood, however, that by commensurately proportioning the extent of the secondary winding of the transformer included in the several grid return leads, any desired voltage may be obtained. In lieu of introducing increasing proportions of the secondary winding of the transformer into the different grid return circuits the differential grid biasing voltages may be obtained by tapping the primary winding 2 of the transformer at appropriate points as is shown in Figs. 3 and 4 for supplying biasing grid voltage to the screen grid of a four-element audion.

As shown in Fig. 4, and by dotted lines in Fig. 3, the primary winding 2 of the transformer 1 is tapped at a substantially mid-point length to afford approximately 50 volts bias for the screen grid element of a screen grid tube being tested. From this tap point a line 23 leads to the double throw switch 16, which, when moved in one direction, closes a connection 24 with which the lead from the screen grid element of the tube on test is connected. Upon movement of the switch 16 in the opposite direction it closes connection with the common grid return line 11' leading to the grid contact of the audion tube socket in which is positioned the tube under test and with which the control grid of the audion is in engagement. Thus by the reversal of the switch 16 first in one direction and then in the other, biasing grid voltage is alternately applied to the control grid element and to the screen grid element of the four-element audion under test. The current flow under both conditions of grid bias, as well as the current flow when the switch 16 is in its intermediate position with both grid elements at zero potential, is indicated upon the meter 10.

The primary tap 23 may likewise be employed for impressing the requisite voltage upon the grids of tubes under test other than of the screen grid type. The switch 12 and connection 8 may if desired be omitted and the switch 16 employed in lieu thereof. The voltage impressed upon the grid of any tube is determined by the relative position of the tap 23 in the primary 2 of the transformer.

In conventional tubes the prong of the screen grid is found in the socket and the contact terminal of the control grid is located on the end of the bulb of the tube. Merely by interchanging one terminal of the lead extending from the tap on the primary winding 2 to the switch 16 with one terminal of the lead extending from the junction 8 intermediate the primary winding 2 and a secondary winding 3 to the switch 12, the device can be used with a screen grid tube having the prong of the screen grid located in the socket and a terminal of the control grid on one end of the bulb of the tube.

Upon the chart 22, defined on top of the housing 20, the standard audion tube characteristics or indices of standard tubes of different types, are preferably arranged in columns. Different columns contain indices of tubes of the different types which are considered "poor", "fair", and "good." It is obvious, however, that other tabulations of the standard tube characteristics may be employed. The readings of the meter 10 under the different conditions of zero grid potential and biasing grid potential are compared with the indices of a standard audion tube of like type appearing upon the comparison chart 22, thus enabling the observer to determine the comparative worth or efficiency of the tube under test. These readings are also compared with each other, that is, the difference between the plate current flow with and without grid biasing potential, being indicative of the influence of the grid element, may be taken as a factor in determining the operating efficiency of the tube.

Having thus described my invention I claim:

1. A tester for an audion of the four-element type including electrical circuits for energizing the filament and plate elements of the audion from a source of alternating current supply, a switch for alternately impressing a biasing grid voltage upon the control grid and upon the screen grid of said audion, and a meter in the plate circuit for measuring the volume of rectified current induced under such changes of grid biasing influence.

2. The method of testing an audion tube of the four-element type including energizing the plate and filament circuits from a source of alternating current supply and alternately connecting the control grid and the screen grid with one of said circuits whereby biasing voltages are applied to the respective grids and indicating the magnitude of the plate current established by each of the applied grid voltages.

3. The method of testing an audion tube of the four-element type including energizing the plate and filament circuits from a source of alternating current supply and alternately connecting the control grid and the screen grid with the source of current supply whereby a grid biasing voltage is separately applied to each grid, and measuring the resultant flow of current in the plate circuit as influenced by each of the biased grid elements.

4. A tester for an audion of the four-element type including electrical circuits for energizing the filament and plate elements of the audion tube under test from a source of alternating current supply, a switch for alternately connecting the control grid and the screen grid with one of said circuits, and a meter in the plate circuit for comparatively measuring the flow of current in said circuit with each of the respective grids separately energized and with both grids excluded from said circuit.

5. In a universal tester for audion tubes of different types, a series of tube sockets, in any one of which a tube for test may be connected, electrical circuits for energizing the filament, plate, and grid elements of tubes to be tested from a common source of alternating current supply, a transformer, the secondary winding of which is divided into sections, the windings of which of different extent are included in the grid circuits of different sockets whereby different grid voltages are impressed upon the grids of tubes when in different sockets of the series.

6. In a universal tester for audion tubes of different types, a series of tube sockets, in any one of which a tube for test may be connected, electrical circuits for energizing the filament, plate, and grid elements of tubes to be tested from a common source of alternating current supply, a transformer, the secondary winding of which is divided into sections to afford different appropriate filament voltages to the filament connections of different tube sockets, the successive sections of the transformer windings being progressively included in the grid return circuits from the grid connections of different tube sockets whereby the voltage drop across such windings of different extent are employed to afford different grid voltages suitable for tubes tested in different sockets.

7. In a universal tester for testing three element tubes and screen grid tubes, a series of tube sockets, in any one of which a tube to be tested may be connected with a common source of alternating current supply, said source including a transformer of which the primary and secondary windings have taps so that each of the windings are divided into sections, means for impressing a predetermined potential from said source upon the grid terminal when a three element tube is tested, and for impressing a more positive potential upon said terminal when a screen grid tube is tested, and a meter in the plate circuit for reading the plate current for the various potentials supplied to the grid.

8. The method of testing a tube having a cathode, a plate or anode, a control grid, and a screen grid, including energizing the plate and cathode circuits from a source of alternating current supply, measuring the resultant plate current without supplying a bias to either of the grid elements and measuring the plate current as influenced by supplying a potential to the screen grid, both with and without a supply of potential to the control grid.

EDMUND T. FLEWELLING.